United States Patent
Chen et al.

(10) Patent No.: US 8,304,131 B2
(45) Date of Patent: Nov. 6, 2012

(54) DIRECT METHANOL FUEL CELL STRUCTURE

(75) Inventors: Jiun-Ming Chen, Taoyuan County (TW); Jyun-Yi Lai, Taoyuan County (TW); Yu-Chih Lin, Taoyuan County (TW)

(73) Assignee: Nan Ya PCB Corp., Taoyuan County (TW)

(*) Notice: Subject to any disclaimer, the term of this patent is extended or adjusted under 35 U.S.C. 154(b) by 333 days.

(21) Appl. No.: 12/753,821

(22) Filed: Apr. 2, 2010

(65) Prior Publication Data

US 2011/0159401 A1    Jun. 30, 2011

(30) Foreign Application Priority Data

Dec. 29, 2009  (TW) ............................ 98145462 A

(51) Int. Cl.
*H01M 8/08* (2006.01)
*H01M 8/10* (2006.01)

(52) U.S. Cl. .................... 429/483; 429/506
(58) Field of Classification Search .......... 429/483, 429/506
See application file for complete search history.

(56) References Cited

U.S. PATENT DOCUMENTS

| 2007/0051193 A1* | 3/2007 | Olenick et al. ............. 73/866 |
| 2007/0178353 A1* | 8/2007 | Karichev et al. ............ 429/35 |
| 2009/0246592 A1* | 10/2009 | Kinoshita ................. 429/33 |

FOREIGN PATENT DOCUMENTS

| DE | 102004052029 A1 | 6/2005 |
| JP | 2008123957 A * | 5/2008 |
| WO | WO 2005006473 A2 | 1/2005 |

* cited by examiner

*Primary Examiner* — Gregg Cantelmo

(57) ABSTRACT

The invention provides a direct methanol fuel cell. The direct methanol fuel cell includes a membrane having a first surface and an opposite second surface. The membrane is sandwiched between a pair of electrodes. Two terminals of the membrane and a portion of the first and second surfaces adjacent to the two terminals are exposed from a pair of the electrodes. A pair of gas diffusion layers is respectively disposed on the pair of electrodes. A plurality of first border material layers having a plurality of holes is respectively physically embedded on the exposed first and second surfaces. A plurality of adhesion materials is respectively mounted on the border material layers, passing through the holes to contact the first and second surfaces of the membrane.

9 Claims, 13 Drawing Sheets

DIRECT METHANOL FUEL CELL STRUCTURE

CROSS REFERENCE TO RELATED APPLICATIONS

This application claims priority of Taiwan Patent Application No. 098145462, filed on Dec. 29, 2009, the entirety of which is incorporated by reference herein.

BACKGROUND OF THE INVENTION

1. Field of the Invention

The present invention relates to a direct methanol fuel cell, and in particular, to a 7-layered membrane-electrode-assembly (MEA7) of a direct methanol fuel cell.

2. Description of the Related Art

Developed 3C (Computer, Communication and Consumer Electronic) products consume more and more power to meet improved function requirements. Requirements of Battery requirements also include high security and convenience, in addition to being lightweight. The size and weight of batteries directly affect their lifespan and size and weight of 3C products. Therefore, fuel cells play an important role in 3C products.

A direct methanol fuel cell (DMFC) using methanol as fuel has high power density of 5000 Whr/L. The DMFC uses methanol to replace hydrogen as fuel. Protons and electrons generated by chemical reactions at the anode of the DMFC reach the cathode by passing through a membrane and the outside circuits. The membrane for the conventional DMFC, contacts methanol over a long period of time, so that methanol at the anode penetrates the membrane to contact the cathode. Therefore, the cathode formed by the catalyst is poisonous and efficiency of the DMFC is reduced. Conventional processes use thick (for example, 5 mil and 7 mil) membranes to solve the aforementioned problem.

The conventional DMFC stack is generally composed by ten to twenty pieces of membrane-electrode-assemblies (MEAs), corresponding gas diffusion layers (GDLs) and flowboards. To reduce DMFC stack leakage resulting from misalignment during the assembly process, preferably, the 5-layered membrane-electrode-assembly (MEA5) composed by the MEA and the GDLs are assembled first; thereby facilitating subsequent assembly processes. The thicker membranes reduce poisons of the cathode, however, the thicker membranes more easily shrink or expand (change size) when absorbing the methanol liquid solution. Therefore, tight sealing of the MEA5 with the flowboards is difficult. Meanwhile, membranes formed by fluorine carbon materials have chemical stability properties and adherence to epoxy, silicon rubber or acrylic glue is difficult. Therefore, using conventional processes, it is hard to assembly the MEA, the GDLs and the flowboards or package materials when forming a module.

Thus, a novel direct methanol fuel cell and method for fabricating the same are desired.

BRIEF SUMMARY OF INVENTION

A direct methanol fuel cell is provided. An exemplary embodiment of a direct methanol fuel cell comprises a membrane having a first surface and an opposite second surface. The membrane is sandwiched between a pair of electrodes, wherein two terminals of the membrane and a portion of the first and second surfaces adjacent to the two terminals are exposed from a pair of the electrodes. A pair of gas diffusion layers is respectively disposed on the pair of electrodes. A plurality of first border material layers having a plurality of holes is respectively physically embedded on the exposed first and second surfaces. A plurality of adhesion materials is respectively mounted on the border material layers, passing through the holes to contact the first and second surfaces of the membrane.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1A:
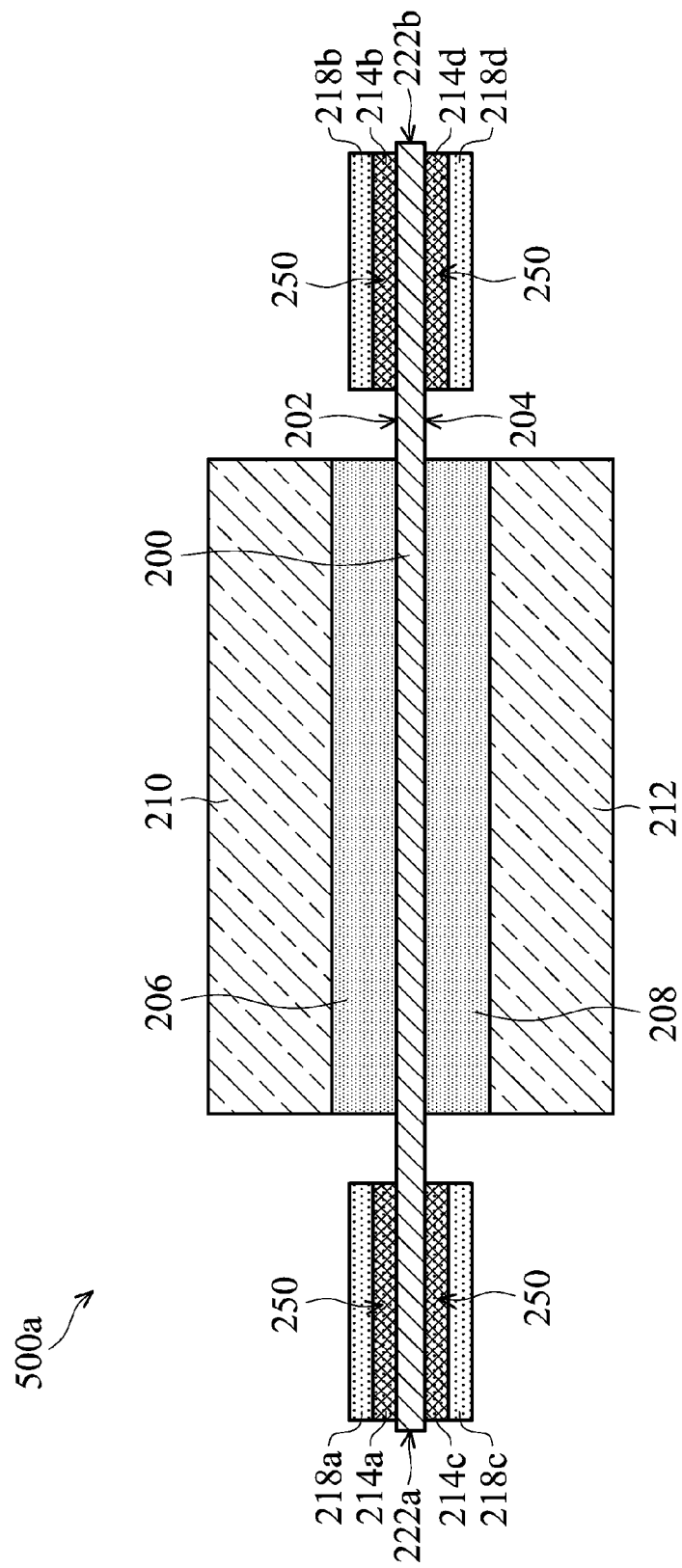
FIGS. 1a-1d are cross section views for various exemplary embodiments of a direct methanol fuel cells of the invention.

The following description is of a mode for carrying out the invention. This description is made for the purpose of illustrating the general principles of the invention and should not be taken in a limiting sense. The scope of the invention is best determined by reference to the appended claims. Wherever possible, the same reference numbers are used in the drawings and the descriptions to refer the same or like parts.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated and not drawn to scale for illustrative purposes. The dimensions and the relative dimensions do not correspond to actual dimensions to practice the invention.

FIGS. 1a-1d are cross section views for various exemplary embodiments of direct methanol fuel cells 500a-500d of the invention. As shown in FIG. 1a, one exemplary embodiment of a direct methanol fuel cell 500a comprises a membrane 200 having a first surface 202 and an opposite second surface 204. The membrane 200 is sandwiched between a pair of electrodes 206 and 208, wherein two terminals 222a and 222b of the membrane 200 and a portion of the first and second surfaces 202 and 204 adjacent to the two terminals 222a and 222b are exposed from a pair of the electrodes 206 and 208. A pair of gas diffusion layers 210 and 212 is respectively disposed on the pair of electrodes 206 and 208. A plurality of first border material layers 214a-214d is respectively physically embedded on the exposed first and second surfaces 202 and 204 of the membrane 200 by a method such as hot pressing, wherein the first border material layers 214a-214d have a plurality of holes 250. It is noted that the first border material layers 214a-214d physically embedded on the membrane 200 indicates that a portion of the membrane 200 is squeezed into the holes 250 of the first border material layers 214a-214d; thereby mounting the first border material layers 214a-214d on the membrane 200. The direct methanol fuel cell 500a further comprises a plurality of adhesion materials 218a-218d respectively mounted on the first border material layers 214a-214d, passing through the holes 250 to connect to the first and second surfaces 202 and 204 of the membrane 200. Additionally, the border material layers 214a-214d and the adhesion materials 218a-218d of the direct methanol fuel cell 500a do not contact to the gas diffusion layers 210 and 212.

Figure 1B:
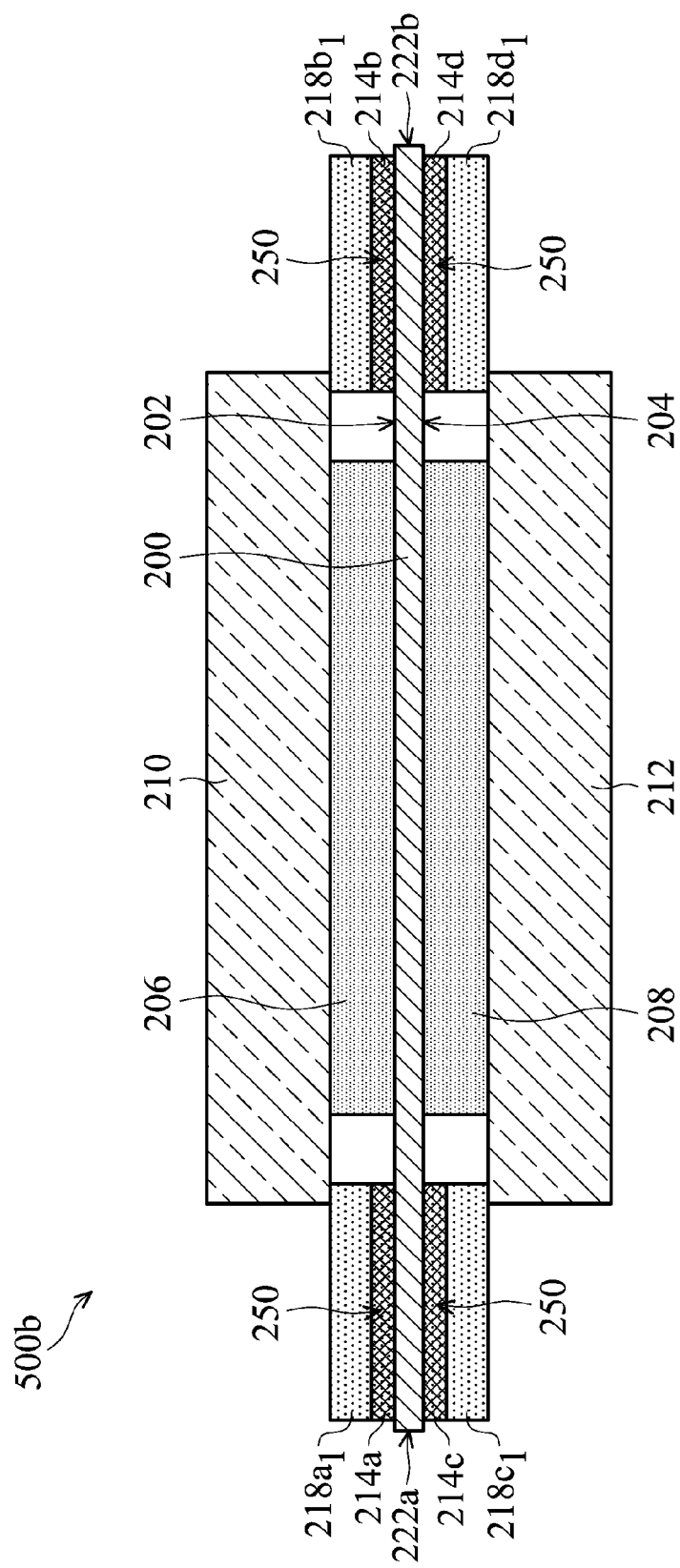

As shown in FIG. 1b, the difference between the exemplary embodiment of a direct methanol fuel cell 500b and the direct methanol fuel cell 500a is that the direct methanol fuel cell 500b has a portion of the first border material layers 214a-214d and a portion of the adhesion materials $218a_1$-$218d_1$ sandwiched between the gas diffusion layers 210 and 212. The adhesion materials $218a_1$-$218d_1$ are bonded to the first border material layers 214a-214d and the gas diffusion layers 210 and 212.

Figure 1C:
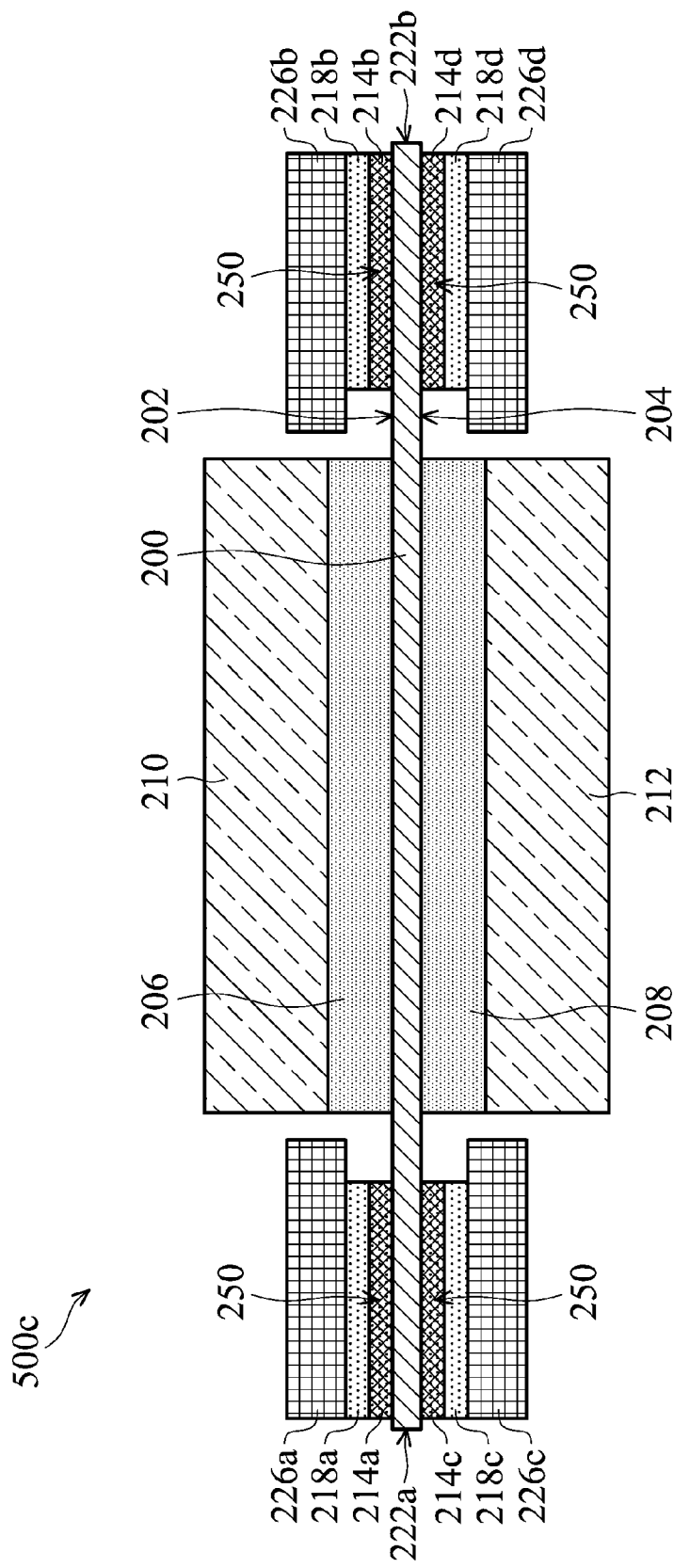

As shown in FIG. 1c, the difference between the exemplary embodiment of a direct methanol fuel cell 500c and the direct methanol fuel cell 500a is that the direct methanol fuel cell 500c further comprises a plurality of second border material layers 226a-226d disposed on a plurality of the adhesion materials 218a-218d, respectively. As shown in FIG. 1c, the adhesion materials 218a-218d of the direct methanol fuel cell 500c are bonded to the first border material layers 214a-214d and the second border material layers 226a-226d. Additionally, the border material layers 214a-214d, the adhesion materials 218a-218d and the second border material layers 226a-226d of the direct methanol fuel cell 500a do not contact to the gas diffusion layers 210 and 212.

Figure 1D:
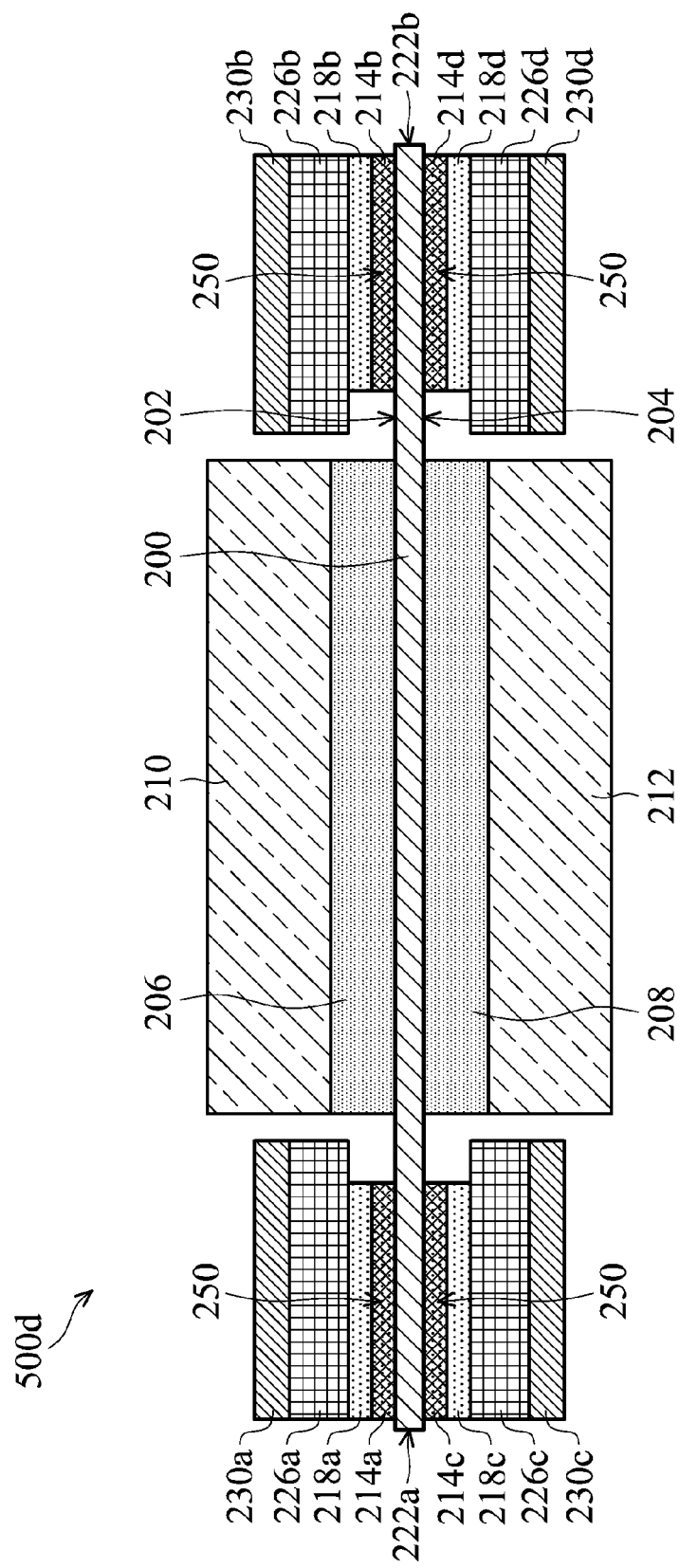

As shown in FIG. 1d, the difference between the exemplary embodiment of a direct methanol fuel cell 500d and the direct methanol fuel cell 500a is that the direct methanol fuel cell 500d further comprises a plurality of buffer layers 230a-230d disposed on a plurality of the second border material layers 226a-226d, respectively. As shown in FIG. 1d, the buffer layers 230a-230d are used to enhance the degree of sealing to the outside flowboards. Additionally, the adhesion materials 218a-218d, the second border material layers 226a-226d and the buffer layers 230a-230d of the direct methanol fuel cell 500d do not contact to the gas diffusion layers 210 and 212.

In the direct methanol fuel cells 500a-500d, the electrodes 206 and 208 may comprise an anode electrode and a cathode electrode formed by an electrochemical anode catalyst and an electrochemical cathode catalyst, respectively. The membrane 200 and the electrodes 206 and 208 are composed as three-layered membrane electrode assemblies (MEA3) with functions of electrochemical reaction and proton transmission. The gas diffusion layers 210 and 212 may be responsible for fuel and reaction product diffusion and electron transmission. The gas diffusion layers 210 and 212 may comprise woven or nonwoven carbon clothes or carbon papers. The first border material layers 214a-214d have holes to increase surface roughness thereof; thereby facilitating mounting on the membrane 200 by physically embedding. The first border material layers 214a-214d may comprise fiberglass clothes, chemical fiber clothes or a roughened metal plate. The adhesion materials 218a-218d or $218a_1$-$218d_1$ may comprise thermofusible or thermosetting polymer films or liquid glues, for example, epoxy resin or linear low-density polyethylene (LL-DPE) with the function of filling the holes 250 of the first border material layers 214a-214d; thereby avoiding fuel leakage for the conventional DMFC and assisting with adherence and mounting of the second border material layers 226a-226d. In some embodiments, the second border material layers 226a-226d may have rigidity such that the finished product formed by pressing is easy to carry and has reduced deformation. The second border material layers 226a-226d may comprise polyethylene terephthalate (PET), FR5 fiberglass polymer materials, thermoplastic polyurethane (TPU), polyethylene (PE), bi-axial oriented polypropylene (BOPP) or polypropylene (PP). The first border material layers 214a-214d and the second border material layers 226a-226d may have properties of fuel corrosion resistance. The buffer layers 230a-230d may comprise silicon rubbers or fluorinated ethylene propylene (FEP).

Figure 2:
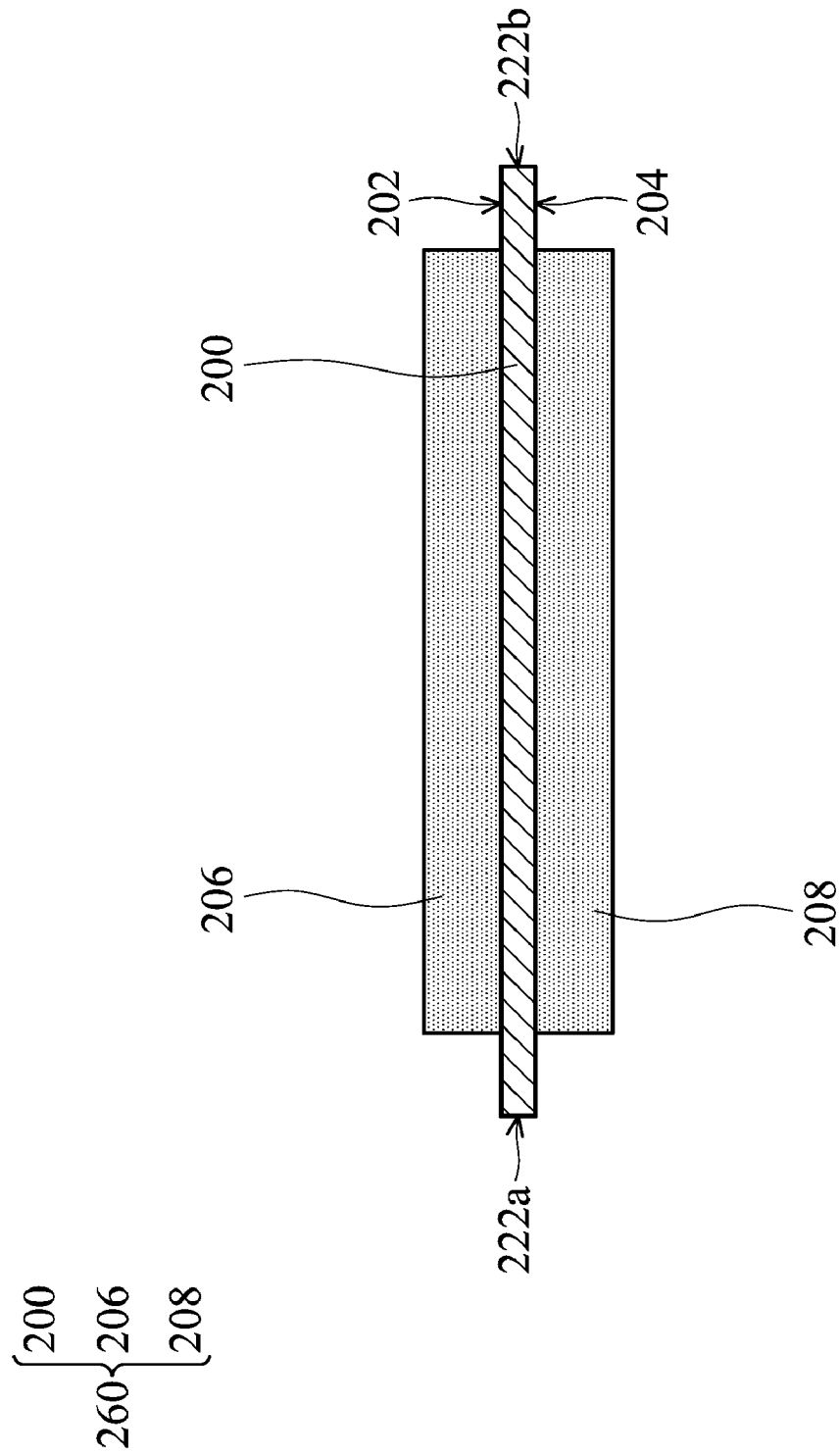
FIGS. 2-6 are cross section views for fabricating one exemplary embodiment of a direct methanol fuel cell of the invention.

FIGS. 2-6 are cross section views for fabricating one exemplary embodiment of a direct methanol fuel cell 500a of the invention. Referring to FIG. 2, a fabricated three-layered membrane-electrode-assembly (MEA3) 260 is provided. In one embodiment, the MEA3 260 may comprise a pair of electrodes 206 and 208 and a membrane 200 sandwiched therebetween, wherein two terminals 222a and 222b of the membrane 200 and a portion of first and second surfaces 202 and 204 adjacent to the two terminals 222a and 222b are exposed from a pair of the electrodes 206 and 208. In one embodiment, the MEA3 260 may be formed by alignment and hot-pressing processes.

Figure 3:
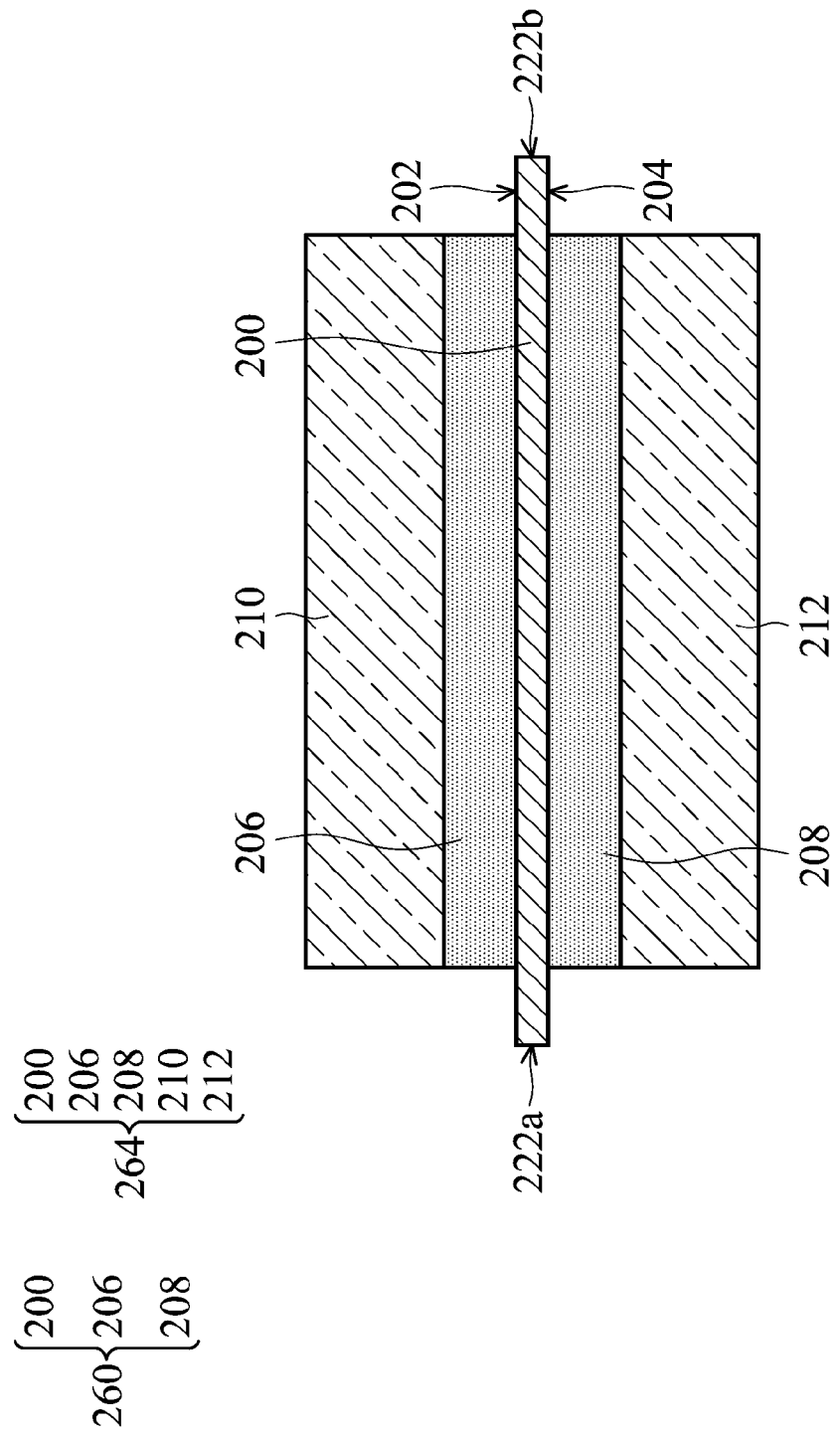
Figure 4:
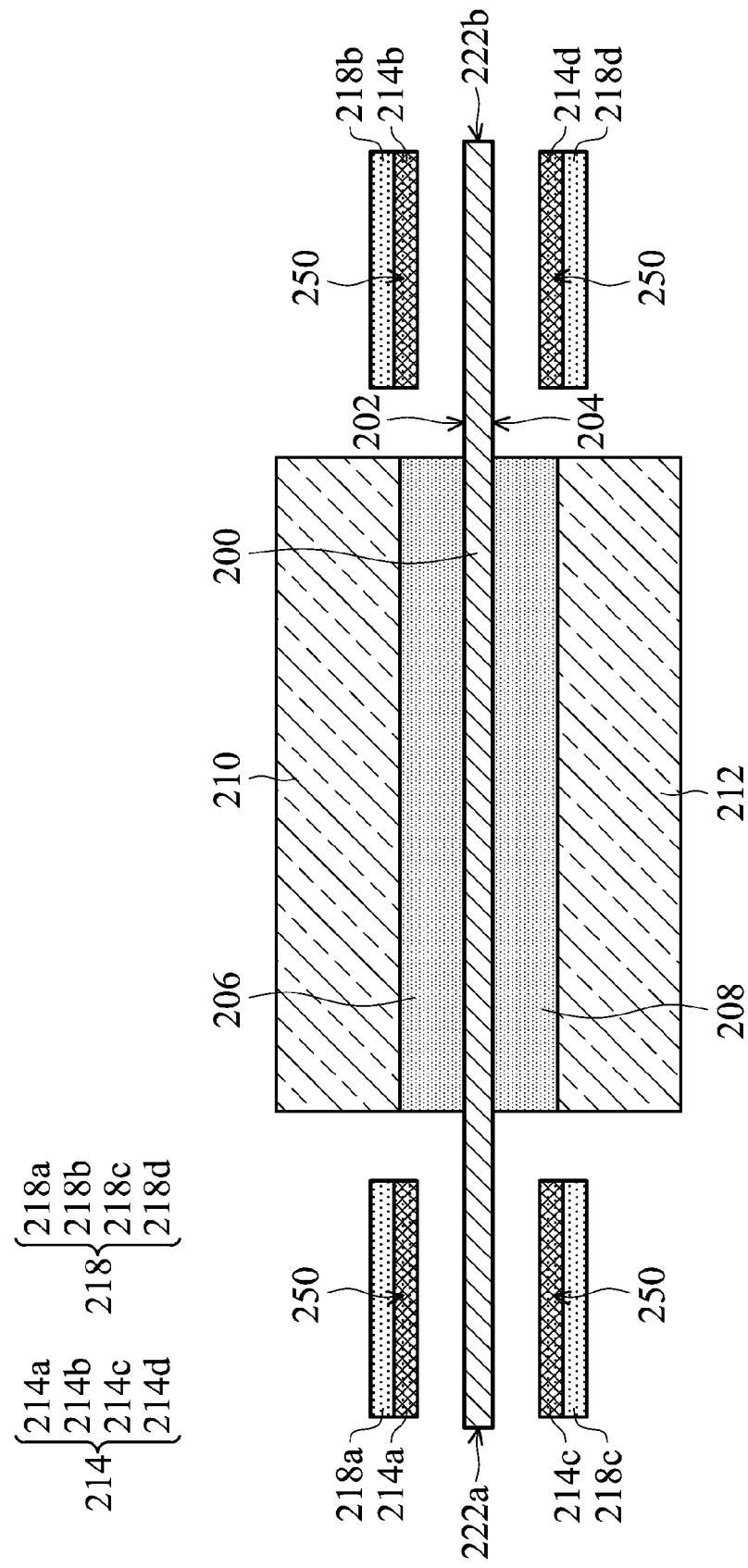

Next, referring to FIG. 3, the MEA3 260 and a pair of the gas diffusion layers may be disposed in a pressing machine, wherein the MEA3 260 is disposed between a pair of gas diffusion layers 210 and 212 so that a first mounting process comprising pressing or a film sticking process is performed to facilitate a pair of the gas diffusion layers 210 and 212 to be mounted on the electrodes 206 and 208, respectively. Therefore, a 5-layered membrane-electrode-assembly (MEA5) 264 comprising the MEA3 260 and a pair of the gas diffusion layers 210 and 212 is formed.

Figure 10:
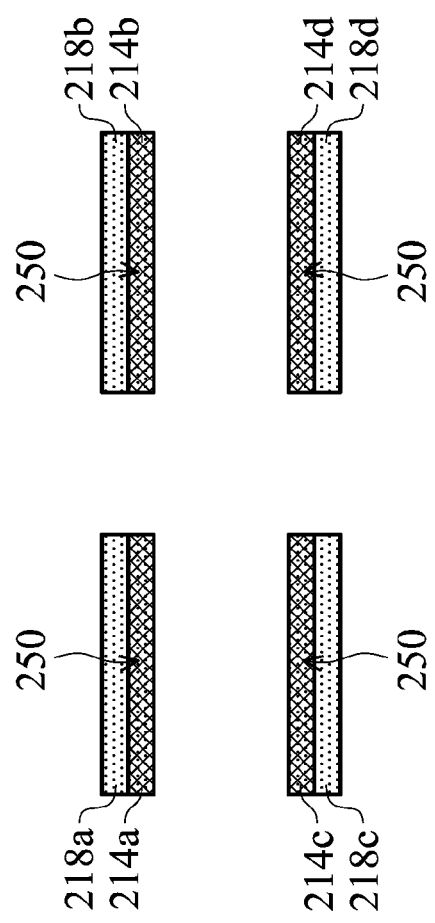
FIG. 10 shows a pre-treatment for one exemplary embodiment of adhesion materials and a first border material layer.

FIG. 10 shows a pre-treatment for one exemplary embodiment of adhesion materials and a first border material layer. The adhesion materials and the first border material layer are difficult to carry because of their thin thickness. To reduce alignment difficulty, a plurality of adhesion materials 218a-218d is firstly mounted on a plurality of first border material layers 214a-214d with holes 250 by mounting processes such as a pressing, a sticking, a coating, a screen printing or a spraying process, wherein a portion of the adhesion materials 218a-218d may fill into the holes 250 of the first border material layers 214a-214d. Next, referring to FIG. 4, the MEA5 264 and the first border material layers 214a-214d with the adhesion materials 218a-218d mounted thereon are disposed in a pressing machine, wherein the first border material layers 214a-214d with the adhesion materials 218a-218d mounted thereon are disposed over exposed first and second surfaces 202 and 204.

Figure 5:
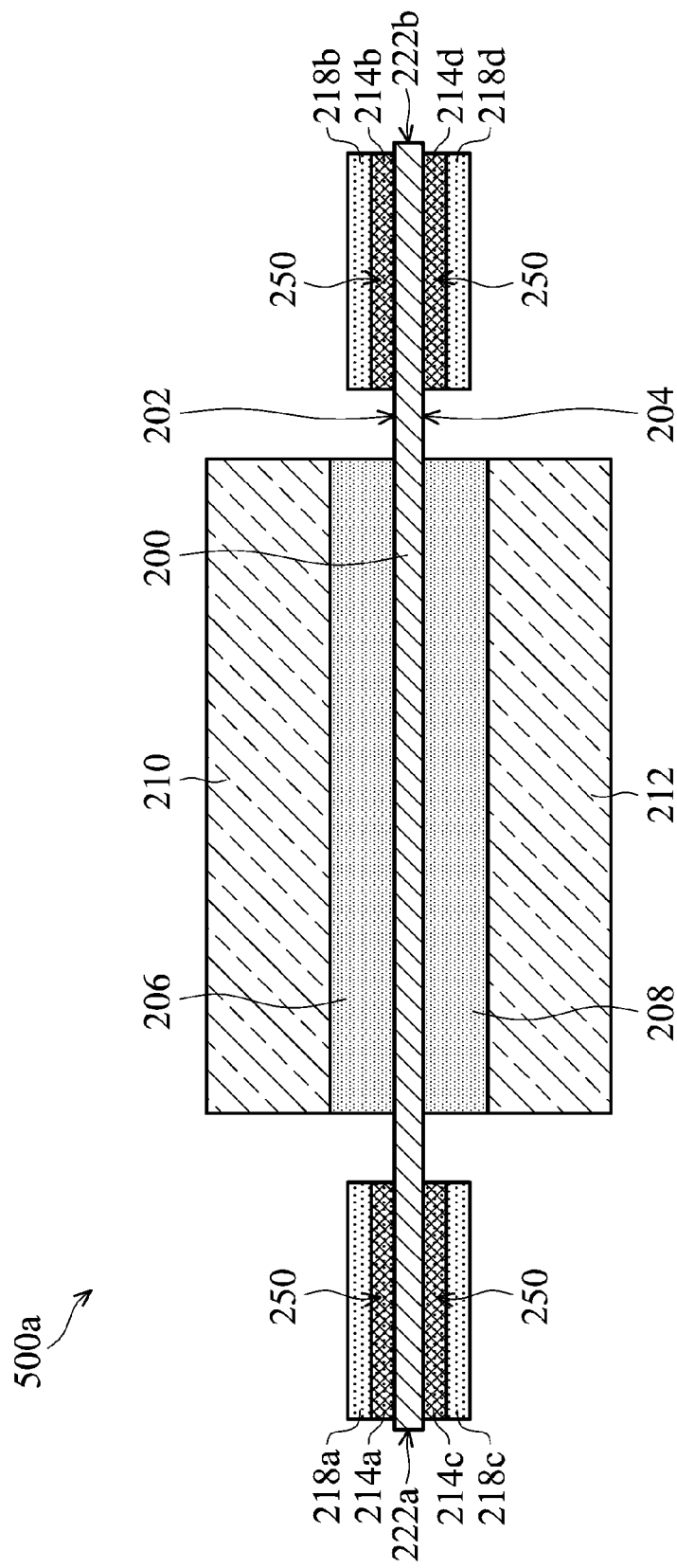

Next, referring to FIG. 5, a second mounting process comprising processes such as a pressing or a film sticking process is performed to respectively physically embed a plurality of the first border material layers 214a-214d on the exposed first and second surfaces 202 and 204, wherein the adhesion materials 218a-218d may pass through the holes 250 of the first border material layers 214a-214d to contact to the exposed first and second surfaces 202 and 204 of the membrane 200. After performing the aforementioned processes, one exemplary embodiment of a direct methanol fuel cell 500a, which is also referred to as a seven-layered membrane-electrode-assembly (MEA7) 500a, is completely formed.

Figure 6:
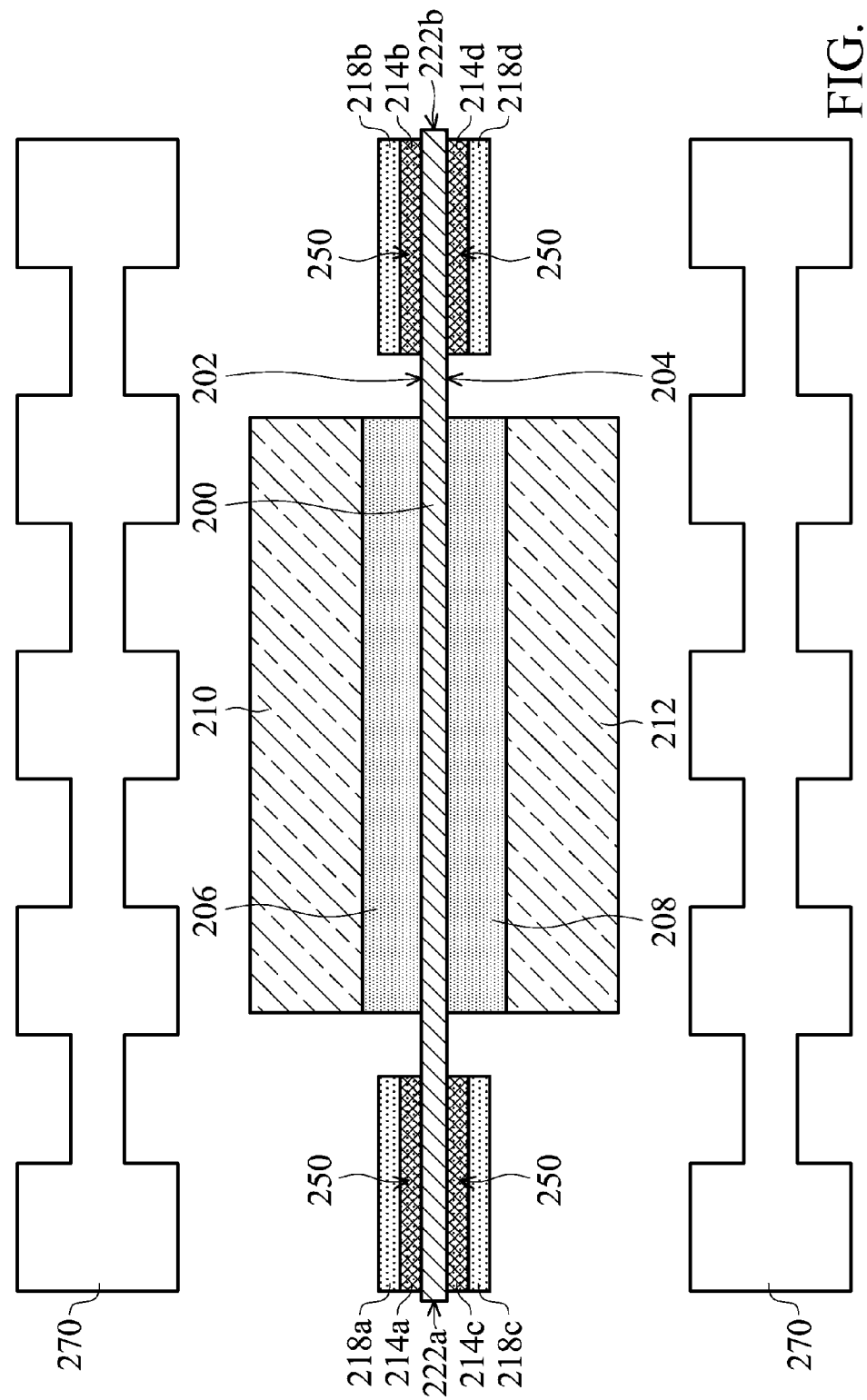

Next, referring to FIG. 6, the direct methanol fuel cell 500a may be disposed between two flowboards 270 to form a direct methanol fuel cell stack.

One exemplary embodiment of a direct methanol fuel cell 500a has a plurality of first border material layers 214a-214d with holes 250. The first border material layers 214a-214d are physically embedded on the membrane 200 through a physical property of surface roughness, thereby enhancing the bonding strength therebetween. The fabricated MEA7 500a may be facilitated by simplifying subsequent laminating processes comprising stacking with the flowboards or stacking various MEAs together. Additionally, because the membrane 200 is physically embedded with the first border material layers 214a-214d, the membrane 200 is more rigid (hard to change its shape). Therefore, battery leakage resulting from the shrinkage or expansion of the conventional membrane is reduced.

Alternatively, in another embodiment, a single mounting process may be performed to respectively and physically embed the first border material layers 214a-214d with the adhesion materials 218a-218d mounting thereon on the exposed first and second surfaces 202 and 204. A pair of the gas diffusion layers 210 and 212 is mounted on the electrodes 206 and 208 of the MEA3 260; thereby forming another exemplary embodiment of a direct methanol fuel cell 500b, which is also referred to as a MEA7 500b, as shown in FIG. 1b. As shown in FIG. 1b, a portion of the first border material layers 214a-214d and a portion of adhesion materials $218a_1$-$218d_1$ of the direct methanol fuel cell 500b are sandwiched between the gas diffusion layers 210 and 212, wherein the adhesion materials $218a_1$-$218d_1$ are bonded to the first border material layers 214a-214d during the mounting process. Therefore, in the direct methanol fuel cell 500b, the membrane 200 of the MEA3 260 adheres to the gas diffusion layers 210 and 212 through the adhesion materials 218a-218d. Compared with the direct methanol fuel cell 500a, the MEA7 of another exemplary embodiment of a direct methanol fuel cell 500b can be formed using only one mounting process.

Figure 7:
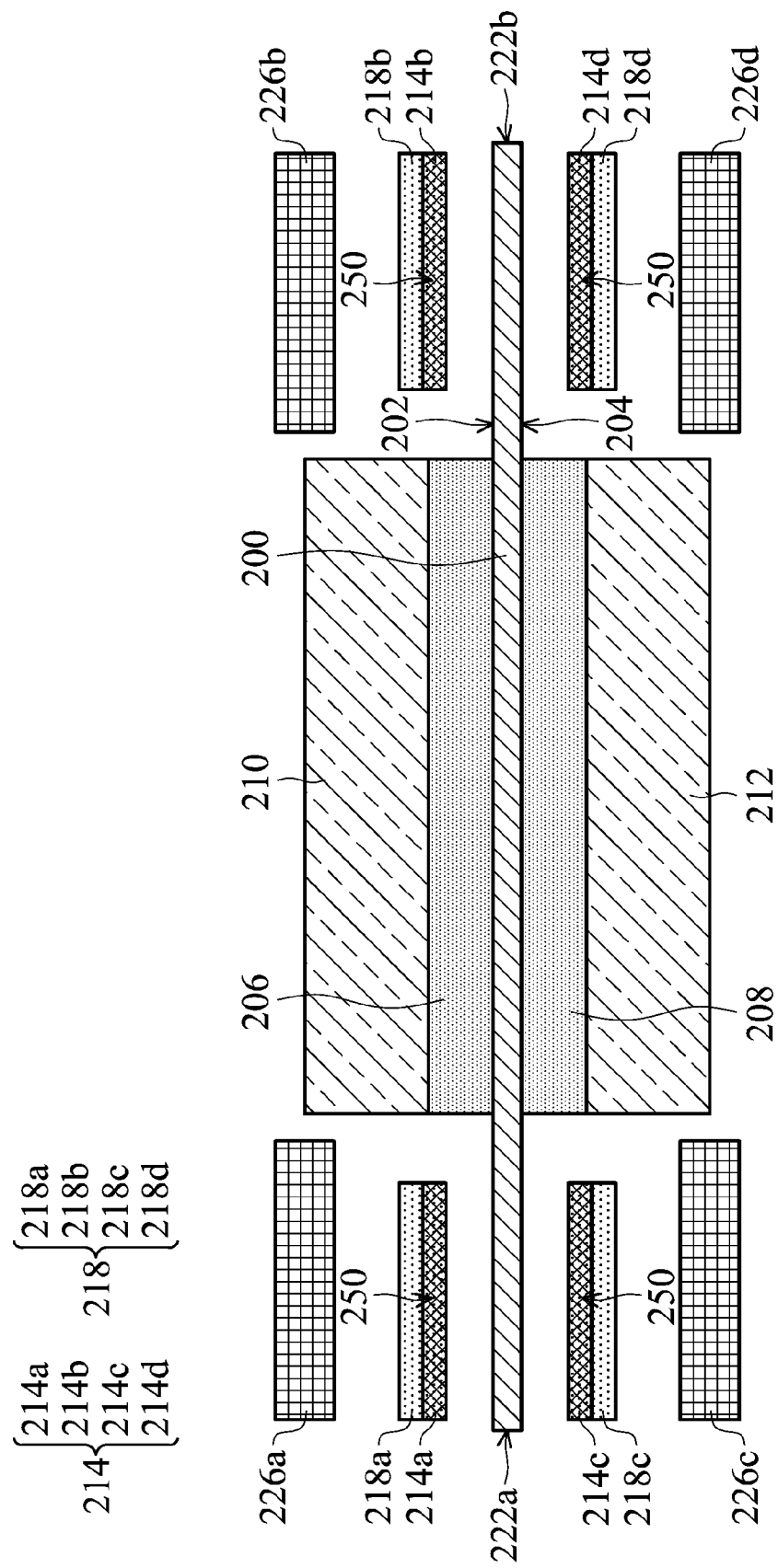
FIGS. 7-9 are cross section views for fabricating another exemplary embodiment of a direct methanol fuel cell of the invention.
Figure 8:
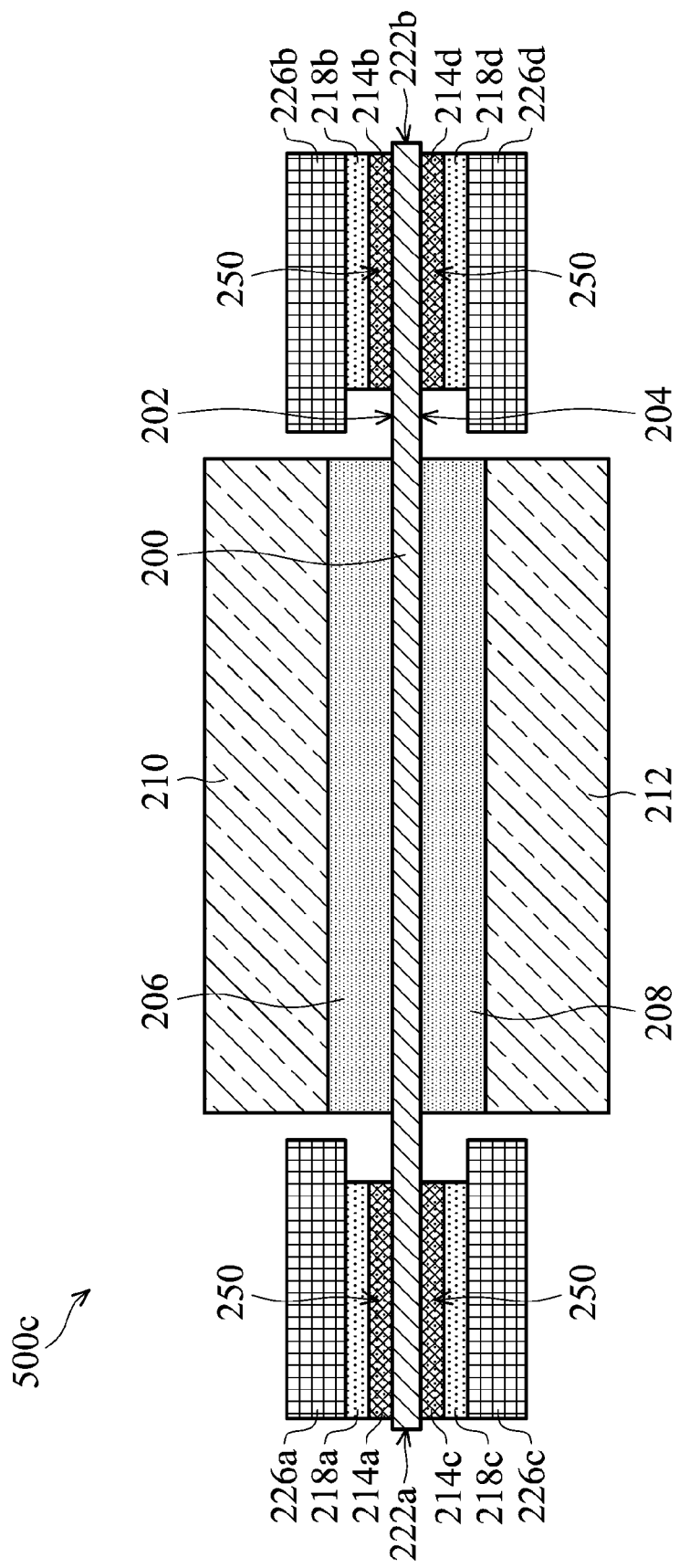
Figure 9:
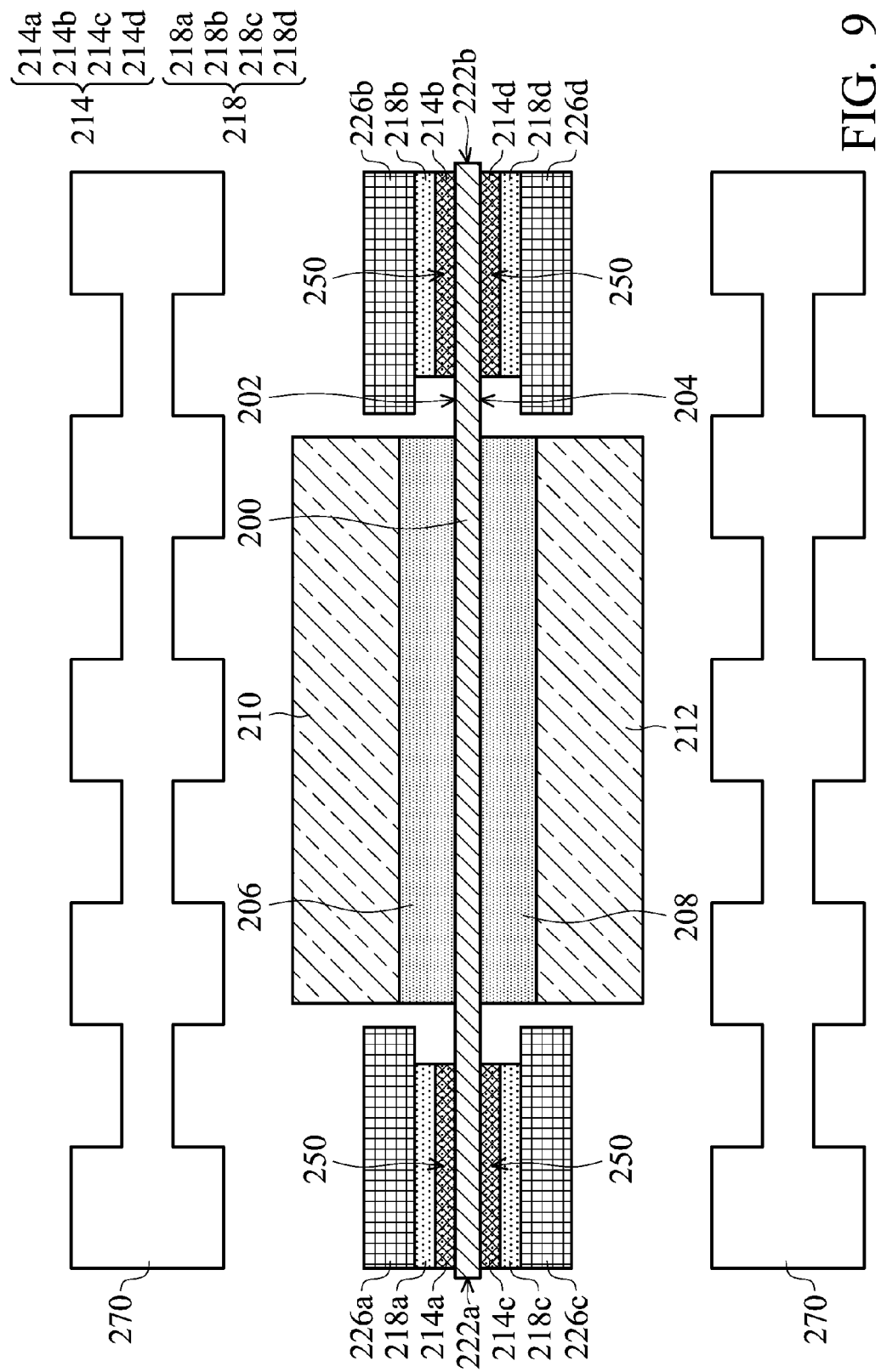

FIGS. 7-9 are cross section views for fabricating yet another exemplary embodiment of a direct methanol fuel cell 500c of the invention. Elements of the embodiments hereinafter, that are the same or similar to those previously described with reference to FIGS. 2-6, are not repeated for brevity.

Please refer to FIG. 7. After forming the MEA5 264, the MEA5 264, the first border material layers 214a-214d with the adhesion materials 218a-218d mounted thereon and a plurality of second border material layers 226a-226d are disposed in a pressing machine, wherein the first border material layers 214a-214d with the adhesion materials 218a-218d mounted thereon are disposed over exposed first and second surfaces 202 and 204. Additionally, a plurality of the second border material layers 226a-226d is disposed over the first border material layers 214a-214d, respectively.

Next, referring to FIG. 8, a second mounting process comprising processes such as a pressing or a film sticking process is performed to respectively and physically embed a plurality of the first border material layers 214a-214d on the exposed first and second surfaces 202 and 204, and respectively and physically embed the second border material layers 226a-226d on the adhesion materials 218a-218d. As shown in FIG. 7, the adhesion materials 218a-218d may pass through the holes 250 of the first border material layers 214a-214d to contact the first and second surfaces 202 and 204 of the membrane 200. After performing the aforementioned processes, the exemplary embodiment of a direct methanol fuel cell 500c, which is also referred to as a 7-layered membrane-electrode-assembly (MEA7) 500c, is completely formed. The direct methanol fuel cell 500c further comprises the second border material layers 226a-226d with rigidity disposed on the first border material layers 214a-214d such that the resulting MEA7 is easy to carry and has reduced deformation. Also, the resulting MEA7 can be closely adhered to the flowboards to avoid fuel leakage for the conventional DMFC from occurring.

Next, referring to FIG. 9, the direct methanol fuel cell 500c may be disposed between two flowboards 270 to form another direct methanol fuel cell stack.

Alternatively, in another embodiment, a plurality of buffer layers 230a-230d is further respectively disposed on the plurality of the second border material layers 226a-226d during the second mounting process. After performing the aforementioned processes, the exemplary embodiment of a direct methanol fuel cell 500d, which is also referred to as a 7-layered membrane-electrode-assembly (MEA7) 500d, as shown in FIG. 1d is completely formed. The buffer layers 230a-230d of the direct methanol fuel cell 500d may increase the degree of seal to the outside flowboards.

Exemplary embodiments provide a direct methanol fuel cell and a method for fabricating the same, wherein the first border material layers adjacent to the membrane has holes. The first border material layers are closely and physically embedded on the membrane through surface roughness thereof, thereby enhancing bonding strength thereamong. The method for fabricating the direct methanol fuel is simpler than the conventional method, thereby avoiding assembly misalignments. In some embodiments, the second border material layers with rigidity may be disposed on the first border material layers such that the resulting MEA7 is easy to carry and has reduced deformation. Also, the resulting MEA7 can be closely adhered to the flowboards to avoid fuel leakage for the conventional DMFC from occurring. Alternatively, a plurality of buffer layers may be respectively disposed on the plurality of the second border material layers to increase the degree of seal to the outside flowboards.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A direct methanol fuel cell, comprising:
    a membrane having a first surface and an opposite second surface, sandwiched between a pair of electrodes, wherein two physical terminal surfaces of the membrane and a portion of the first and second surfaces adjacent to the two physical terminal surfaces are exposed from a pair of the electrodes;
    a pair of gas diffusion layers respectively disposed on the pair of electrodes;
    a plurality of first border material layers having a plurality of holes respectively physically embedded on the exposed first and second surfaces; and
    a plurality of adhesion materials is respectively mounted on the border material layers, passing through the holes to contact to the first and second surfaces of the membrane.

2. The direct methanol fuel cell as claimed in claim 1, wherein a plurality of the first border material layers comprises fiberglass clothes, chemical fiber clothes or a roughened metal plate.

3. The direct methanol fuel cell as claimed in claim 1, wherein the membrane adheres to a pair of the gas diffusion layers through a plurality of the adhesion materials.

4. The direct methanol fuel cell as claimed in claim 1, wherein a plurality of the adhesion materials comprises epoxy resin or linear low-density polyethylene (LLDPE).

5. The direct methanol fuel cell as claimed in claim 1, further comprising a plurality of second border material layers disposed on the plurality of the adhesion materials, respectively.

6. The direct methanol fuel cell as claimed in claim 5, wherein a plurality of the second border material layers comprises polyethylene terephthalate (PET), FR5 fiberglass polymer materials, thermoplastic polyurethane (TPU), polyethylene (PE), bi-axial oriented polypropylene (BOPP) or polypropylene (PP).

7. The direct methanol fuel cell as claimed in claim 5, further comprising a plurality of buffer layers disposed on the plurality of the second border material layers, respectively.

8. The direct methanol fuel cell as claimed in claim 7, wherein a plurality of the buffer layers comprises silicon rubbers or fluorinated ethylene propylene (FEP).

9. The direct methanol fuel cell as claimed in claim 7, wherein a plurality of the adhesion materials, a plurality of the second border material layers and a plurality of the buffer layers do not contact to a pair of the gas diffusion layers.

* * * * *